US011411732B2

(12) United States Patent
Ramesh et al.

(10) Patent No.: US 11,411,732 B2
(45) Date of Patent: Aug. 9, 2022

(54) PRIME NUMBER GENERATION FOR ENCRYPTION

(71) Applicant: Juniper Networks, Inc., Sunnyvale, CA (US)

(72) Inventors: Rathna Ramesh, Sunnyvale, CA (US); Anna M. Johnston, Vancouver, WA (US)

(73) Assignee: Juniper Networks, Inc., Sunnyvale, CA (US)

(*) Notice: Subject to any disclaimer, the term of this patent is extended or adjusted under 35 U.S.C. 154(b) by 62 days.

(21) Appl. No.: 16/852,172

(22) Filed: Apr. 17, 2020

(65) Prior Publication Data

US 2021/0328792 A1 Oct. 21, 2021

(51) Int. Cl.
*H04L 9/30* (2006.01)
*H04L 9/08* (2006.01)

(52) U.S. Cl.
CPC ............ *H04L 9/3033* (2013.01); *H04L 9/085* (2013.01)

(58) Field of Classification Search
CPC .............................. H04L 9/3033; H04L 9/085
See application file for complete search history.

(56) References Cited

U.S. PATENT DOCUMENTS

| 2004/0090907 A1* | 5/2004 | An | G06F 7/584 |
| | | | 370/208 |
| 2008/0310634 A1* | 12/2008 | Pavlovic | H04L 9/302 |
| | | | 380/270 |
| 2014/0355758 A1* | 12/2014 | Feix | G06F 17/11 |
| | | | 380/46 |
| 2015/0128798 A1* | 5/2015 | Kariyama | B62L 3/023 |
| | | | 92/61 |
| 2020/0382954 A1* | 12/2020 | Chazot | H04L 9/14 |

FOREIGN PATENT DOCUMENTS

JP 2003122251 A 4/2003

OTHER PUBLICATIONS

Extended European Search Report for Application No. EP20178085.5, dated Oct. 30, 2020, 10 pages.
Mukherjee N., et al., "Ring Generator: An Ultimate Linear Feedback Shift Register", Computer, IEEE Computer Society, Jun. 1, 2011, vol. 44 (6), pp. 64-71, XP011355831.

* cited by examiner

*Primary Examiner* — Alexander Lagor
*Assistant Examiner* — William B Jones
(74) *Attorney, Agent, or Firm* — Harrity & Harrity, LLP

(57) ABSTRACT

A device may select a first pseudorandom integer within a range of integers. The device may generate a first candidate prime, based on the first pseudorandom integer, for primality testing. Based on determining that the first candidate prime fails a primality test, the device may select a second pseudorandom integer within the range of integers. The device may generate a second candidate prime, based on the second pseudorandom integer, for primality testing. The device may determine whether the second candidate prime satisfies the primality test. The device may selectively: re-perform, based on the second candidate prime failing the primality test, the selecting the second pseudorandom integer, the generating the second candidate prime, and the determining whether the second candidate prime satisfies the primality test, or using, based on the second candidate prime satisfying the primality test, the second candidate prime as a prime integer in a cryptographic protocol.

20 Claims, 11 Drawing Sheets

PRIME NUMBER GENERATION FOR ENCRYPTION

BACKGROUND

Public-key algorithms may be based on computational difficulty of various problems, such as integer factorization of two-prime composite integers and the difficulty of calculating discrete logarithms. Many cryptographic systems may be built around prime integers, such as the prime integers used in factoring based, finite field, or elliptic curve cryptography.

SUMMARY

According to some implementations, a method may include selecting, by a device, a first pseudorandom integer within a range of integers; generating, by the device, a first candidate prime for primality testing, wherein the first candidate prime is based on a product of known prime integers and the first pseudorandom integer; determining, by the device, that the first candidate prime fails a primality test; selecting, by the device and based on a Galois register or a linear feedback shift register, a second pseudorandom integer within the range of integers; generating, by the device, a second candidate prime for primality testing, wherein the second candidate prime is based on a product of the product of the known prime integers and the second pseudorandom integer; determining, by the device, whether the second candidate prime satisfies the primality test; and selectively: re-performing, by the device and based on the second candidate prime failing the primality test, the selecting, using the Galois register or the linear feedback shift register, the second pseudorandom integer, the generating the second candidate prime, and the determining whether the second candidate prime satisfies the primality test, or using, by the device and based on the second candidate prime satisfying the primality test, the second candidate prime as a prime integer in a cryptographic protocol or in generation of another prime.

According to some implementations, a device may include one or more memories and one or more processors. In some implementations, the one or more processors are communicatively coupled to the one or more memories. The one or more processors may be configured to: select a pseudorandom integer within a range of integers; check the pseudorandom integer against a sieve to determine whether a candidate prime, based on known prime integers and the pseudorandom integer, is divisible by any of a set of sieving primes; selectively: re-perform, based on a determination that the candidate prime is divisible by any of the set of sieving primes, the selection of the pseudorandom integer within the range of integers and the check of the pseudorandom integer against the sieve, or generate, based on a determination that the candidate prime is not divisible by any of the set of sieving primes, the candidate prime for primality testing, wherein the candidate prime is based on the known prime integers and the pseudorandom integer; determine whether the candidate prime satisfies a primality test; and selectively: re-perform, based on the candidate prime failing the primality test, the selection of the pseudorandom integer, the check of the pseudorandom integer against the sieve, and the selective re-performance of the selection of the pseudorandom integer and the check of the pseudorandom integer against the sieve or the generation of the candidate prime, and the determination of whether the candidate prime satisfies the primality test, or use, based on the candidate prime satisfying the primality test, the candidate prime as a prime integer in a cryptographic protocol or in generation of a large prime that is greater than the candidate prime.

According to some implementations, a non-transitory computer-readable medium may store one or more instructions. The one or more instructions, when executed by one or more processors of a device, may cause the one or more processors to: perform a selection of a pseudorandom integer within a range of integers, the selection of the pseudorandom integer comprising: selection of a candidate pseudorandom integer; performance of a check of the candidate pseudorandom integer against a sieve to determine whether a candidate prime, that is based on the candidate pseudorandom integer, is divisible by any of a set of sieving primes; and selective: re-performance, based on a determination that the candidate prime is divisible by any of the set of sieving primes, of the selection of the candidate pseudorandom integer and the check of the candidate pseudorandom integer against the sieve, or generation, based on a determination that the candidate prime is not divisible by any of the set of sieving primes, of the candidate prime for primality testing, wherein the candidate prime is based on a product of known prime integers and the pseudorandom integer; and selectively: re-perform, based on the candidate prime failing a primality test, the performance of the selection of the pseudorandom integer and the generation of the candidate prime, or use, based on the candidate prime satisfying the primality test, the candidate prime as a prime integer in a cryptographic protocol or in generation of another prime.

DETAILED DESCRIPTION

Figure 1A:
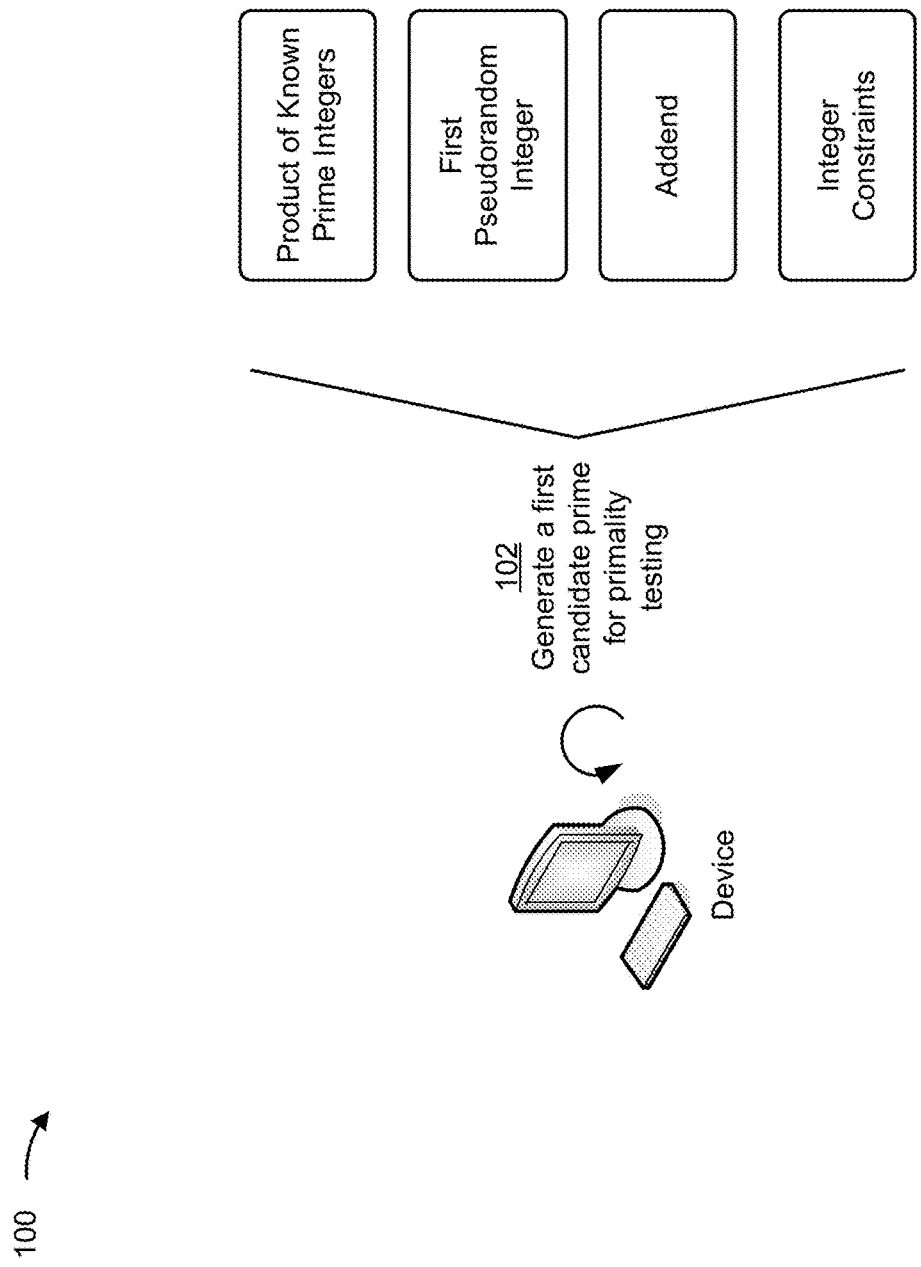
FIGS. 1A-1F are diagrams of one or more example implementations described herein.

The following detailed description of example implementations refers to the accompanying drawings. The same reference numbers in different drawings may identify the same or similar elements.

Cryptographic systems may be built around prime integers. Some cryptographic systems (e.g., discrete logarithm based public key cryptographic systems) use a fixed prime integer as an element to provide security for the systems. However, a malefactor may attempt to break into the system by attacking the fixed prime integer. Fixed prime integers imply a very high value to cost ratio for these attacks, greatly increasing the motivation of attackers and risk to users. Furthermore, improvements in computing power over time may reduce the amount of time that may be required to successfully mount this attack. Once a successful attack occurs, discrete logarithms modulo the fixed prime integer become relatively easy to compute and the cryptographic system may be compromised.

According to some implementations described herein, a device may be configured to replace a prime integer based on satisfaction of a timing event. In other words, prime integers may expire after a time period and the device may be configured to replace the prime integer with a replacement prime integer. In a process of selecting prime integers, the device may generate a first candidate prime for primality testing with the candidate integer based on a product of known prime integers and a first pseudorandom integer. To conserve computing resources, the device may use a sieve to determine if the first pseudorandom integer is divisible by any of a set of sieving primes (e.g., which may indicate that the first candidate integer is not a prime integer). In this way, the device may conserve computing resources that may otherwise be used to perform additional and/or more resource-intensive calculations for a primality test (e.g., a Pocklington test) to determine if the first candidate prime is a prime integer.

In some implementations, the device may select a second pseudorandom integer (e.g., based on the first candidate prime failing the primality test, the sieve indicating that the first candidate prime is divisible by any of the set of sieving primes, and/or the like) based on a Galois register, a linear feedback shift register (LFSR), and/or the like. In this way, the device may select pseudorandom integers (e.g., such that the candidate prime based on the pseudorandom integer and the product of known primes avoids consistent step sizes to eliminate bias for prime integers following a prime gap, that selects each pseudorandom integer from a range without repeating, and/or the like) for testing with the sieve and/or generate candidate primes based on the pseudorandom selection process. In some implementations, the device may check successive pseudorandom integers against the sieve before generating the successive candidate primes, before performing the primality tests, and/or the like. By using a Galois register, an LFSR, and/or the like to select pseudorandom integers to use in generating candidate primes for primality testing, the device may increase entropy to a prime number selection process, which may improve security.

FIGS. 1A-1F are diagrams of one or more example implementations described herein. As shown in FIGS. 1A-1F, the example implementation(s) 100 may include a device that performs a prime integer generation process using Pocklington's theorem, a Pocklington test, a sieve, a Galois register, and/or the like.

A cryptographic system functionality may require a prime integer to have certain properties. For example, systems based on a difficulty of computing an $r^{th}$ root (where r is a large prime) in a finite group, $r^2$ must divide the order of the group. If the group is $(Z/PZ)^*$, then $p=hr^2+1$ for some integer h. Pocklington's theorem gives a primality test for candidate integers of the form $P=(hR+1)$ where a complete factorization of R is known. Pocklington's theorem may be an efficient tool for generating and/or testing candidate primes, with sieves, Galois registers, and/or linear feedback shift registers (LFSRs) to improve efficiency for determining primality and to increase randomness of selections of candidate integers for testing.

In some implementations described herein, the device may use an algorithm for generating a prime integer. For example, the device may use Algorithm 1:

---
Algorithm 1
---
I: Choose a random starting value $h_L \leq h_0 < h_U$ and set $h = h_0$.
II: While $P = (Rh + 1)$ fails primality test:
   A: Increment h;
   B: If $h = h0$, then return 0 (FAILURE);
III: Return P

---

In Algorithm 1, $h_L$ and $h_U$ are lower and upper bounds for h, with $h_L \leq h_0 < h_U \leq R^2$. As described in Algorithm 1, the device may test a candidate prime for primality. Based on whether the candidate prime satisfies a primality test, the device may either increment a value h used to generate a new candidate prime to be tested, or the device may output the tested candidate prime (e.g., based on finding that the candidate prime satisfies the primality test).

As shown by reference number 102 in FIG. 1A, the device may generate a first candidate prime for primality testing. In some implementations, the first candidate prime may be based on a product of known prime integers, a first pseudorandom integer, an addend (e.g., 1 or a prime number), one or more integer constraints, and/or the like. In some implementations, the pseudorandom integer constraints may include a range of integers from which the first pseudorandom integer may be selected.

In some implementations, the first candidate prime may be based on Equation 1 and Equation 2:

$$P = hR + 1 \quad \text{(Equation 1)}$$

$$R = \Pi_{k=1}^{t} r_k^{m_k} \quad \text{(Equation 2)}$$

where h is a pseudorandom integer (e.g., the first pseudorandom integer), $r_k$ are distinct prime integers, and $m_k$ are positive integers. If certain size constraints hold on h in comparison to R, primality can be proven with only (t+1) modulo P exponentiations.

Using Pocklington's theorem based prime generation, the device may start with smaller, product of known prime integers (R) to find larger primes using h values that pass Pocklington's test. The device may repeat these steps to find successively larger primes.

In some cryptographic systems, the device may attempt to generate a prime integer that satisfies one or more constraints. Based on the one or more constraints, the device may generate the first candidate prime for primality testing such that the first candidate prime satisfies the one or more constraints.

In some implementations, the one or more constraints may include a size constraint. A size of the pseudorandom integer may be required to be within a given bit range, as shown in Equation 3.

$$\text{bit range: } 2^B < P < 2^{B+1} \quad \text{(Equation 3)}$$

In Equation 3, B may be a number of bits as determined by security standards and user requirements. A larger B increases a computational cost of field based attacks such as a number field sieve and variants of the number field sieve.

In some implementations, the one or more integer constraints may include a group structure constraint. Security and functional requirements for a cryptosystem may dictate a structure of a multiplicative group (e.g., constraints on factorization of (P−1)). For example, the requirements may indicate that there must be at least one large prime factor (r) of (P−1), with r>2b. In some implementations, b may be a bit count as determined by current security standards. A larger b may increase a computational cost of field based attacks (e.g., a number field sieve) and group based attacks on the prime integer.

Figure 1B:
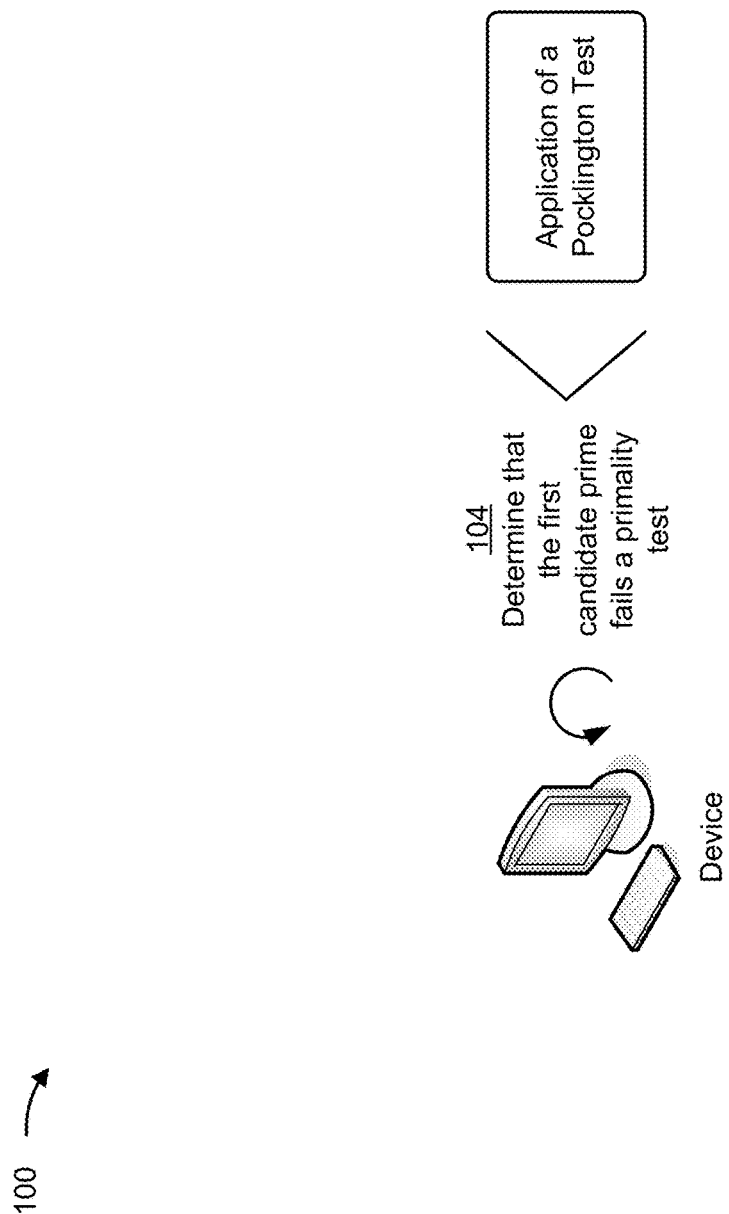

As shown by FIG. 1B, and by reference number 104, the device may determine that the first candidate prime fails a primality test. In some implementations, the primality test may include application of a Pocklington test and/or another primality test. In some implementations, the Pocklington Test may be applied based on a determination that the pseudorandom integer (h) is not divisible by any of a set of sieving primes (e.g., using a sieve to determine whether an h value used to generate a candidate prime is divisible by any of the set of sieving primes). In some aspects, the device may check subsequent iterations of the pseudorandom integer (h) against the sieve after determining that the first candidate prime fails the primality test. In this way, the device may conserve computing resources that may otherwise have been used to perform the Pocklington Test on candidate primes that may be filtered out by the sieve.

Pocklington's theorem states that if a candidate integer (P) passes a test, then all factors of the candidate integer have similar attributes to the candidate integer. In other words, if $q_j$ is a factor of P, then:

$$q_j = (Rh_j + 1) \text{ with } h_j \geq 1, \text{ where } h_j \text{ is a value of } h \quad \text{(Equation 4)}$$

If P is composite (e.g., not a prime), it must have at least two factors ($q_j$) of this form. These factors may force h to be fairly large (e.g., greater than R). If $h \leq R$, then P is not composite and must be prime.

Extensions on the bounds of h may increase flexibility of Equation 4. Increasing the bounds of h may increase potential for entropy in a generated prime integer and/or reduce computing resources consumed to apply Equation 4 by reducing necessary steps (i.e., to allow for faster growth) and required exponentiations.

Figure 1C:
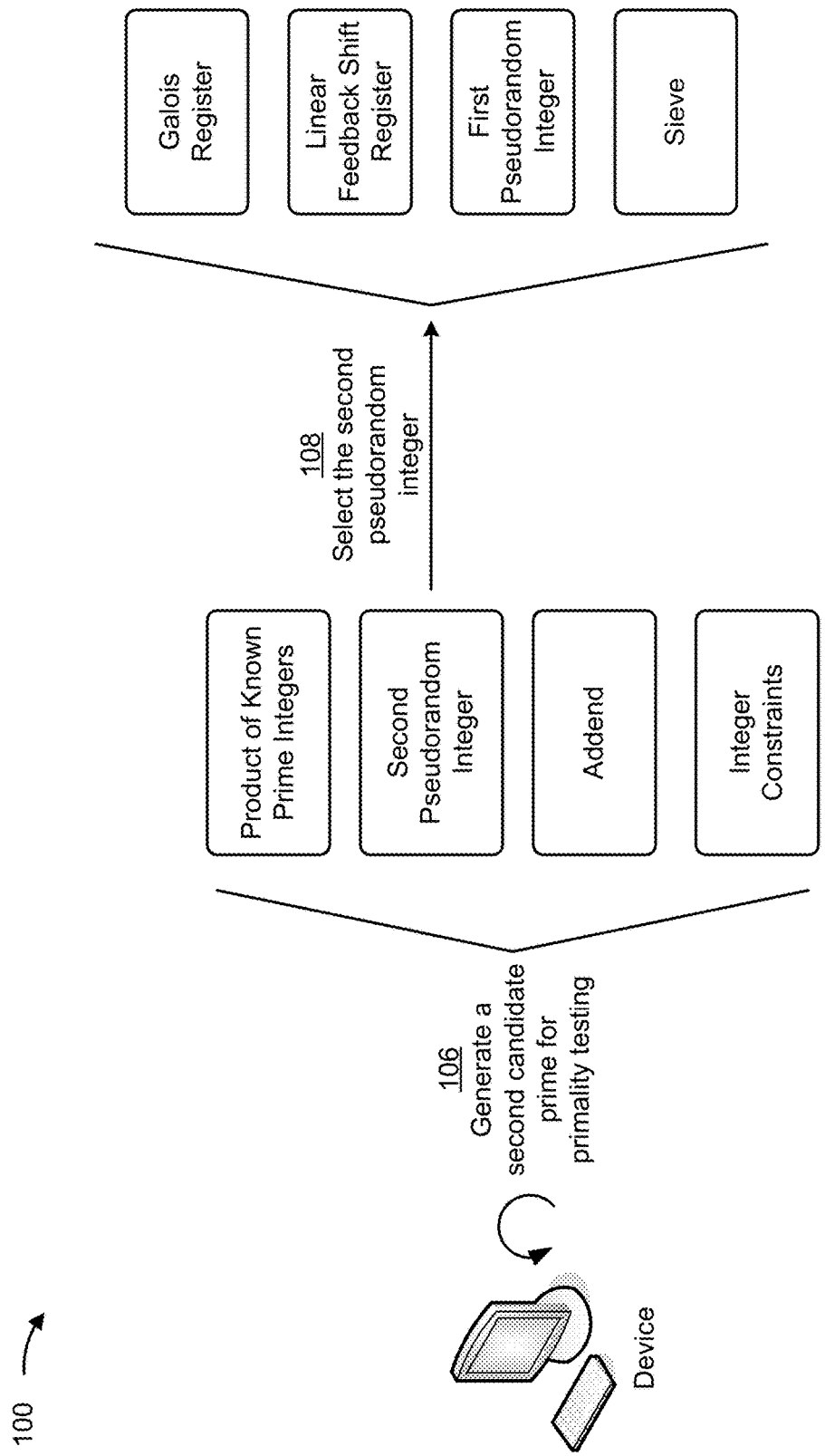

As shown by reference number 106 in FIG. 1C, the device may generate a second candidate prime for primality testing (e.g., based on a determination that the first candidate prime failed the primality test). In some implementations, the device may generate the second candidate prime for primality testing based on a known number, a second pseudorandom integer (e.g., a second iteration of h, an addend, integer constraints, and/or the like. For example, the device may generate the second candidate prime based on Algorithm 1 with the product of known integers R, the second pseudorandom integer h, the addend 1, and integer constraints (e.g., constraints for h).

As shown by reference number 108, the device may generate the second pseudorandom integer based on a Galois register, an LFSR, the first pseudorandom integer, a sieve, and/or the like. In some implementations, the device may be configured to step through values of h within a range of values such that values of h are not repeating, incrementing h may be include random or pseudorandom selections of h, and h may be bounded (e.g., based on bounds of R and/or P).

Galois registers and/or LFSRs may require a relatively small amount of computing resources and imitate a random number generator in a deterministic way. Galois registers may satisfy randomness tests and may cycle over all possible non-zero values (e.g., without repeating values). If a k bit Galois register or LFSR starts at an initial value (e.g., based on a random selection process, a pseudorandom selection process, user input, input from another device, and/or the like) 0<reg<2', the Galois register or LFSR can be stepped $2^k - 1$ times before it repeats. Galois registers may use polynomials, polynomial arithmetic, and/or modular polynomial arithmetic to generate pseudorandom outputs. The following Algorithm 2 iterates through a Galois register, given a current non-zero initial state $reg_0$ and current state reg.

Algorithm 2

I: Constants:
    ply = integer representing lower k coefficients of a degree k primitive binary polynomial Algorithm 2 -continued mask = $2^{k-1}$
II: If reg = 0: Return ERROR
III: If reg&mask = 0: reg = reg << 1
IV: Else: reg = ((reg $\oplus$ mask) << 1) $\oplus$ ply
V: If reg = $reg_0$: Set reg = 0
VI: Return As shown in Algorithm 2, the device may use a Galois register to modify reg by stepping reg with a fixed, degree k polynomial. As shown at operation II, Algorithm 2 will output an error indication if the reg=0 because the register cannot be zero. As shown at operation III, the device may shift the register value one bit to the left (e.g., multiplying by 2) if the operation reg&mask=0. As shown at operation IV, if reg&mask≠0, the device may shift the register value one bit to the left and reduces. As shown at operation V, if the reg=$reg_0$ (e.g., the current register value is equal to the starting register value), the register has run out of possible register values and the register value is set to 0. The value of the register during each iteration may be used to increment h through iterations of h. In some implementations, if the Galois register or LFSR fails to identify a value of h that can be used to generate a prime integer, the device may modify $h_U$ (e.g., by increasing $h_U$ by 1 or 1<<B, where B is a bit count of a maximum value of h or a bit count of a maximum value of $h + h_L$).

In some implementations, the device may generate and use a sieve to reduce computing costs associated with trial division. The device may generate the sieve over a size of the LFSR or Galois register. If the LFSR or the Galois register is k-bits long, and 64-bit words are used to store the sieve data, then $2^{k-6}$ words may be needed for the sieve. For k=16, the sieve may require a 1024 bit array of 64-bit words. Size restriction of the sieve may bound a size of the LFSR or Galois register. In some implementations, the LFSR or Galois register may not cover the entire h range. Instead, h may be divided into sections, each k-bits long.

Based on the size constraints on $h(h_L \leq h_0 < h_U)$, h can be rewritten as $h = h_L + h'$, where $0 \leq h' < h_R$ and $h_R = (h_U - h_L)$. A quantity of acceptable values for h' may be divided into k-bit words. The k-bit words may be initialized with non-zero values, then incremented using the LFSR or the Galois register to find subsequent values of h and integers for primality testing. If $$s = \left\lfloor \frac{lg h_R}{k} \right\rfloor,$$

then:

$$h' = h^{(s)} 2^{sk} + \sum_{j=0}^{s-1} h^{(j)} 2^{jk}, \quad \text{Equation 5}$$

where $0 \leq h^{(j)} < 2^k$ for $0 \leq j < s$ and $0 \leq h^{(s)} < \left\lfloor \frac{h_R}{2^{sk}} \right\rfloor$.

Using Algorithm 2 and/or Equation 5, the device may increment h in a clock-like process to generate integers for primality testing. In some implementations, the device may use Algorithm 3, below, for extended LFSR or Galois incrementing (e.g., stepping). In Algorithm 3, the device may provide input of $h_0 = h_0^{(s)} 2^{sk} + \Sigma_{j=0}^{s-1} h_0^{(j)} 2^{jk}$ for starting register values $h_0^{(j)} \neq 0$ for $0 \leq j \leq s$ and $h' = h^{(s)} 2^{sk} + \Sigma_{j=0}^{s-1} h^{(j)} 2^{jk}$ for a current register value, $h^{(j)} \neq 0$ for $0 \leq j \leq s$.

---

Algorithm 3

---

I: Set j = (s − 1)
II: While (j ≥ 0) AND a call to Algorithm 2 returns an error:
    A: Subtract one from j: j = j − 1
III: If j < 0: return ERROR
IV: Else return

---

The device may use Algorithm 3 to modify h' and return an error if boundaries have been exhausted. The device may use Algorithm 4, described below, to check integers h against a sieve as part of primality testing (e.g., to determine which integers should be used to generate candidate primes), which may occur before applying a Pocklington test. The device may provide input for Algorithm 4, including a small prime set ($S = \{q_i\} 1 \leq i \leq s$), a known prime factorization of $P = hR+1$ (R), a quantity of bits to sieve (k), and fixed portions of h (w, $\{h^{(j)}\}$) with $0 \leq j \leq s$ and $j \neq w$. Algorithm 4 may output a k long bit array with good h values (not divisible by elements of the small prime set) set to 'on.'

---

Algorithm 4

---

I. Create a k-long bit array A and set all k bits of A to 'on' (set to 1)
II: For each prime $q_i \in S$ A: $h^{(w)}[i] = -\left((R2^{wk})^{-1} + \Sigma_{\substack{j=0 \\ j \neq w}}^{s} h^{(j)} 2^{(j-w)k} + h_L 2^{-wk}\right) \bmod q_i$ B. Set v = $h^{(w)}[i]$
  C. While v < $2^k$:
    1: Turn off bit v of A
    2: Set v = v + $q_i$
III: Return A

---

Algorithm 5, below, may be used to determine primality. In Algorithm 5, the device may provide inputs including an indication of whether the device had already applied a sieve to a pseudorandom integer h used to generate a candidate prime P and a set of devisors $\{r_j | 1 \leq j \leq t\}$ of (P−1), ordered with $r_j^{m_j} > r_{j+1}^{m_{j+1}}$.

---

Algorithm 5

---

I: Set Status = unsure
II: If wasSieved = false: Test for small primes divisors − return composite if a divisor is found
III: Set g = 2
IV: While status = unsure:
  A: If $g^{P-1} \neq 1 \bmod P$: Set status = composite
  B: j = 1
  C: rem = (P − 1)
  D: Set:divisors = 1
  E: While status = unsure and divisors < $rem^2$ and j ≤ t:
    1: Compute $x = g^{P/r_j} - 1 \bmod P$
    2: If gcd(x, P) = 1:
      a: While rem ≡ 0 mod $r_j$: Set
        i: rem = rem/$r_j$
        ii: divisors = divisors · $r_j$
      b: Else: Add one to g: g = g + 1, and set divisors = 0
  F: If rem ≤ divisors: status = prime
  G: Else if $rem^2$ ≤ divisors
    1: status = PocklingtonExtension (h, R)
V: return status

---

As shown at operation II, Algorithm 5 may check for small divisors if needed (e.g., if the sieve was not applied). As shown at operation III, Algorithm 5 may set a base for Pocklington's tests. As shown at operation IV, Algorithm 5 may attempt to determine whether the tested integer satisfies one or more elements of a primality test. As shown at operation IV(A), Algorithm 5 may determine that if the tested integer fails a Fermat test, the tested integer is not prime. Operation IV(B) shows that Algorithm 5 may set an index for prime divisors of R to 1. As shown at operation IV(C), Algorithm 5 may allow all powers of R to be removed from (P−1). Operation IV(D) shows that Algorithm 5 may store a size of divisors with (P−1)=rem·divisors. As shown at operation IV(E)(1), Algorithm 5 may apply Pocklington's second test. Operation IV(E)(2) shows that Algorithm 5 may remove all powers of $r_1$ from rem and insert all powers of $r_1$ into divisors. As shown at operation IV(E)(b), Algorithm 5 may try a different base based on a likelihood that the tested integer is prime. At operation IV(F), Algorithm 5 may determine if the tested integer satisfies a simple Pocklington's test.

As shown by operation IV(G), if the tested integer fails the simple Pocklington's test, Algorithm 5 may determine if the tested integer satisfies a Pocklington Extension algorithm. The Pocklington Extension algorithm is shown below as Algorithm 6. The device may input a random portion of the tested integer (h) and a known portion of the tested integer (R). Algorithm 6 may output true if the tested integer is prime or false if the tested integer is composite.

---

Algorithm 6

---

I. Constants: A small set of primes $\{q_j | 0 \leq j < 1000\}$, with $q_0 = 5$, $q_1 = 7$, and so on.
II: Set status = false
III: Set b = (h mod R)$^2$ IV: Set $a = 4 \cdot \left[\dfrac{h}{R}\right]$ V: If b < a: neg = true; val = a − b
VI: Else neg = false; val = b − a
VII: Set j = 0
VII: While j < 1000 and status = false -continued Algorithm 6

A: Compute $v = val^{\frac{q_j-1}{2}} \mod q_j$

B: If neg is true:
    1: If $(q_j - 1)/2$ is odd and v=1: status = true
    2: Else $(q_j - 1)/2$ is even and $v = qj - 1$: status = true
C: Else if $v = (q_j - 1)$: status = true
D: j = j + 1

As shown at operation II, the status may indicate whether the device has determined, using Algorithm 6, that the tested integer is prime. Initially, the status may be set to false until the tested integer fails a quadratic residue test. At operation V, Algorithm 6 may determine a difference between b and a and accounts for the difference being negative or positive. As shown at operation VIII(B), Algorithm 6 may determine whether the tested integer is prime based on the difference between b and a being negative. As shown at operation VIII(C), Algorithm 6 may determine whether the tested integer is prime based on the difference between b and a being positive.

Figure 1D:
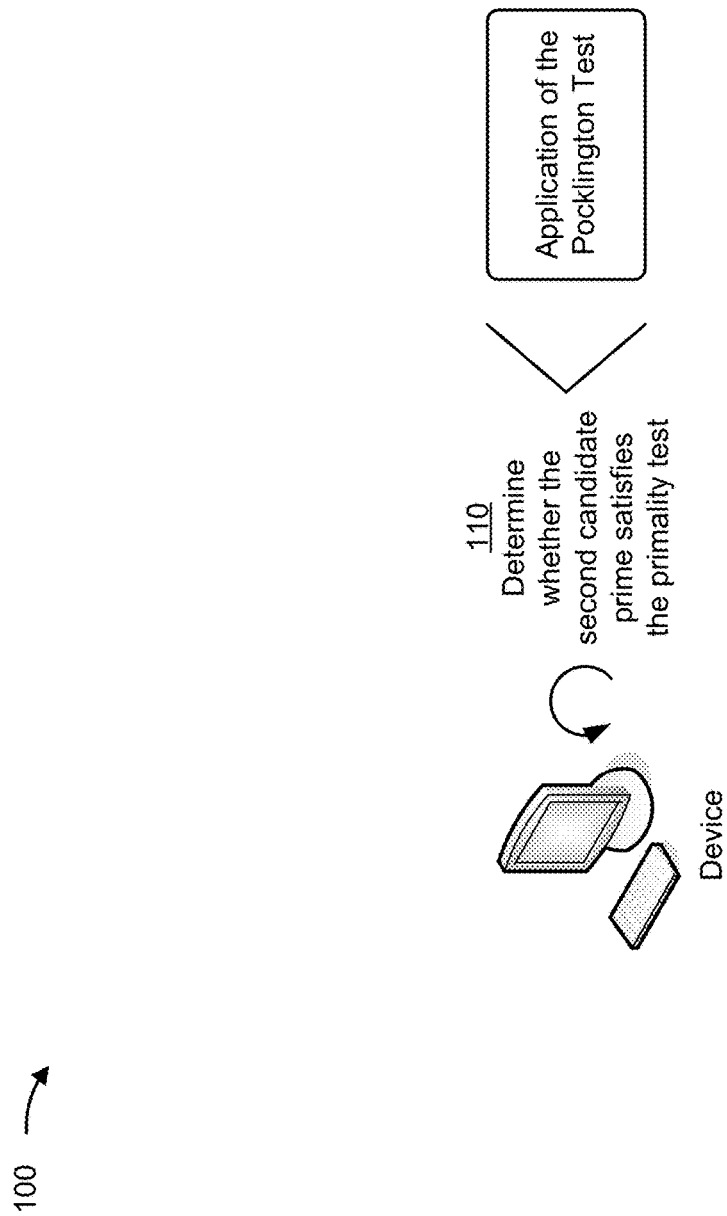

As shown by reference number 110 in FIG. 1D, the device may determine whether the second candidate prime satisfies the primality test. In some implementations, the device may determine whether the second candidate prime satisfies the primality test based on application of the sieve, application of the Pocklington Test, and/or the like. In some implementations, based on the device failing the primality test, the device may re-perform generating the second pseudorandom integer, generating the second candidate prime, and determining whether the second candidate prime satisfies the primality test. In other words, based on the second candidate prime failing the primality test, the device may continue searching for a prime integer (e.g., using the process described for generating the second candidate prime and testing the second candidate prime).

Figure 1E:
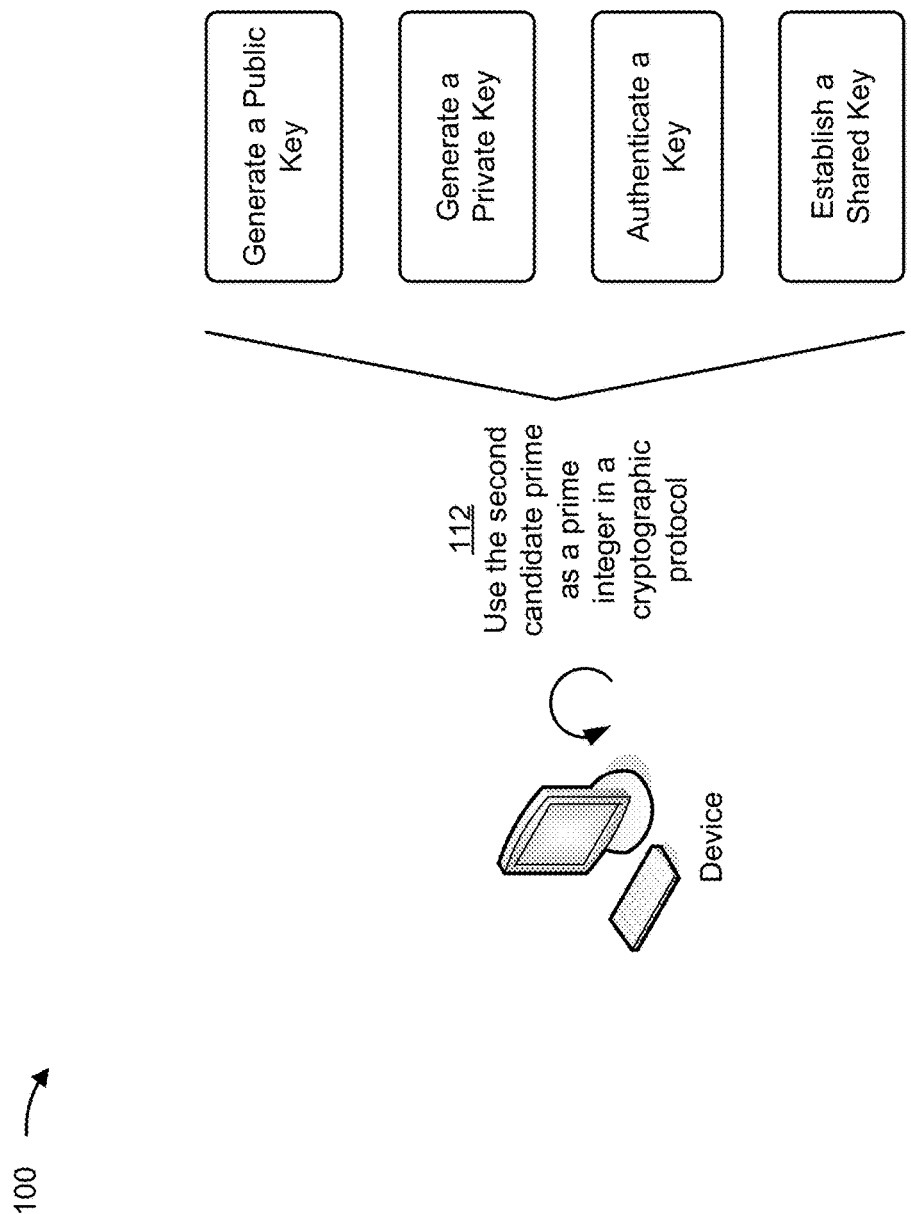

As shown by reference number 112 in FIG. 1E, the device may use the second candidate prime as a prime integer in a cryptographic protocol or in generation of another prime (e.g., larger prime. For example, the device may use the prime integer to generate a public key, generate a private key, authenticate a key, establish a shared key, and/or the like.

Figure 1F:
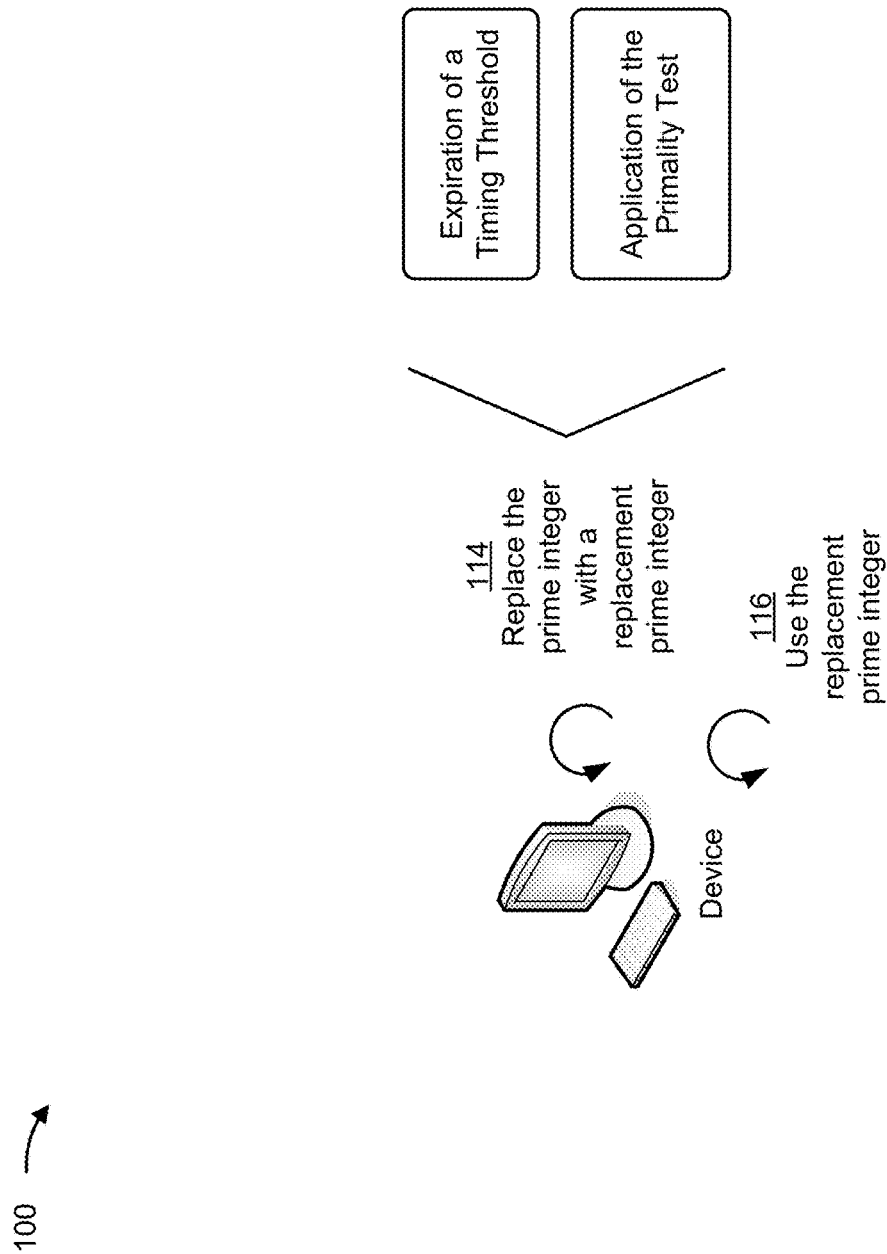

As shown by reference number 114 in FIG. 1F, the device may replace the prime integer with a replacement prime integer. In some implementations, the device may determine to replace the second candidate prime with a replacement prime integer based on satisfaction (e.g., expiration) of a timing threshold. In some implementations, the device may repeat the process of searching for a prime integer until the device determines that a candidate integer satisfies the primality test.

As shown by reference number 116, the device may use the replacement prime integer in a cryptographic protocol or in generation of another prime. For example, the device may use the replacement prime integer to generate a public key, generate a private key, authenticate a key, establish a shared key, and/or the like As indicated above, FIGS. 1A-1F are provided merely as one or more examples. Other examples may differ from what is described with regard to FIGS. 1A-1F.

Figure 2:
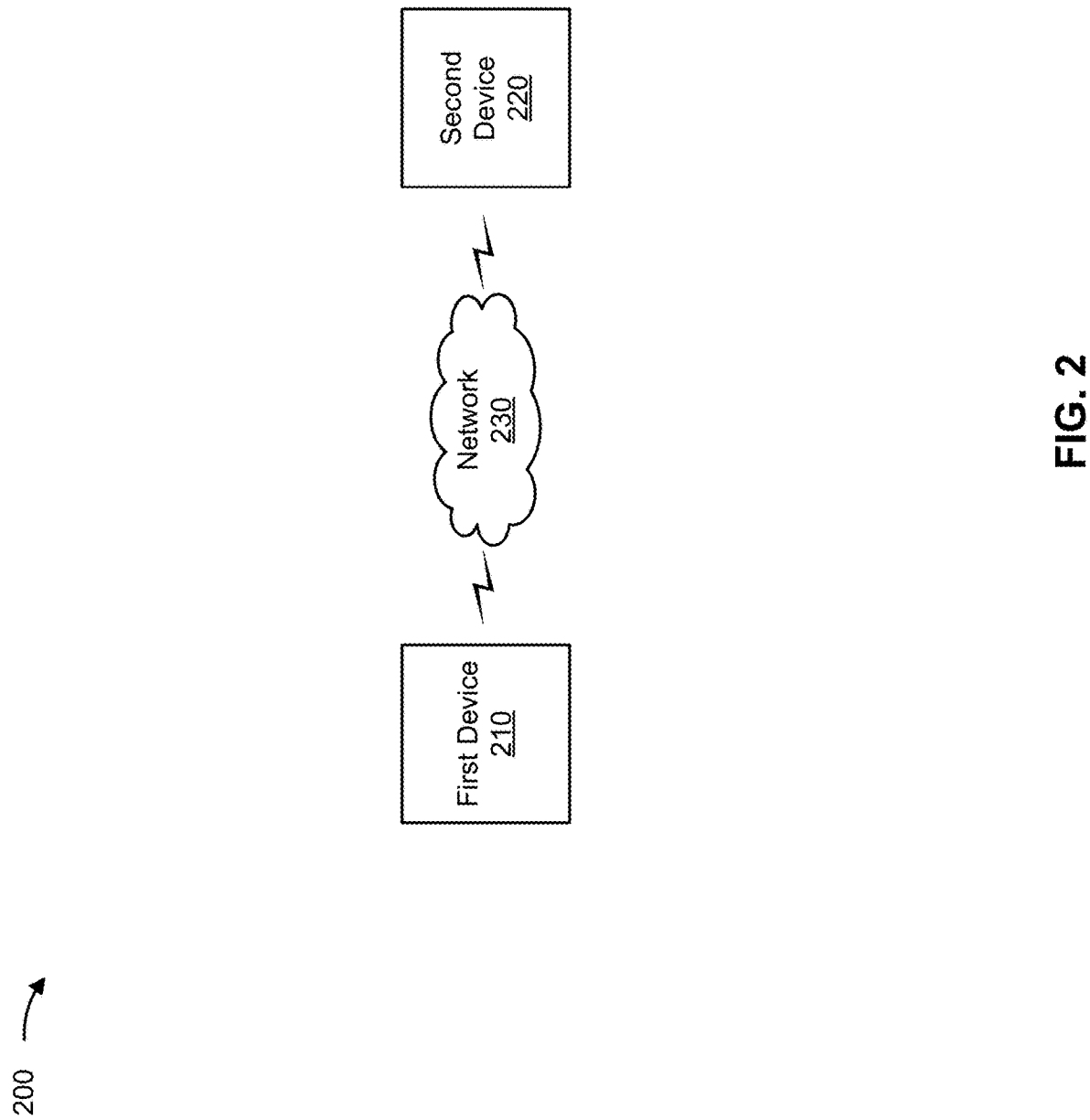
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a first device 210, a second device 220, and a network 230. Devices of environment 200 may interconnect via wired connections, wireless connections, or a combination of wired and wireless connections.

The first device 210 includes one or more devices capable of receiving, generating, storing, processing, and/or providing information associated with key exchanges, encrypting and/or decrypting communications, and/or the like. The first device 210 may include a communication device and/or a computing device. For example, the first device 210 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The first device 210 may communicate with one or more other devices of environment 200, as described elsewhere herein.

The second device 220 includes one or more devices capable of receiving, generating, storing, processing, and/or providing information associated with key exchanges, encrypting and/or decrypting communications, and/or the like. The second device 220 may include a communication device and/or a computing device. For example, the second device 220 may include a wireless communication device, a UE, a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an IoT device, or a similar type of device. The second device 220 may communicate with one or more other devices of environment 200, as described elsewhere herein.

The network 230 includes one or more wired and/or wireless networks. For example, the network 230 may include a cellular network (e.g., a fifth generation (5G) network, a fourth generation (4G) network, a long-term evolution (LTE) network, a third generation (3G) network, a code division multiple access (CDMA) network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 230 enables communication among the devices of environment 200.

In some implementations, the first device 210 may transmit a first public key to the second device 202 via the network 230. The second device 220 may transmit a second public key to the first device 210. The first device 210 and the second device 220 may determine a shared secret (e.g., a shared key) based on the first public key and the second public key. The first device 210 and the second device 220 may encrypt data, communicate encrypted data, and/or decrypt data based on the shared secret.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
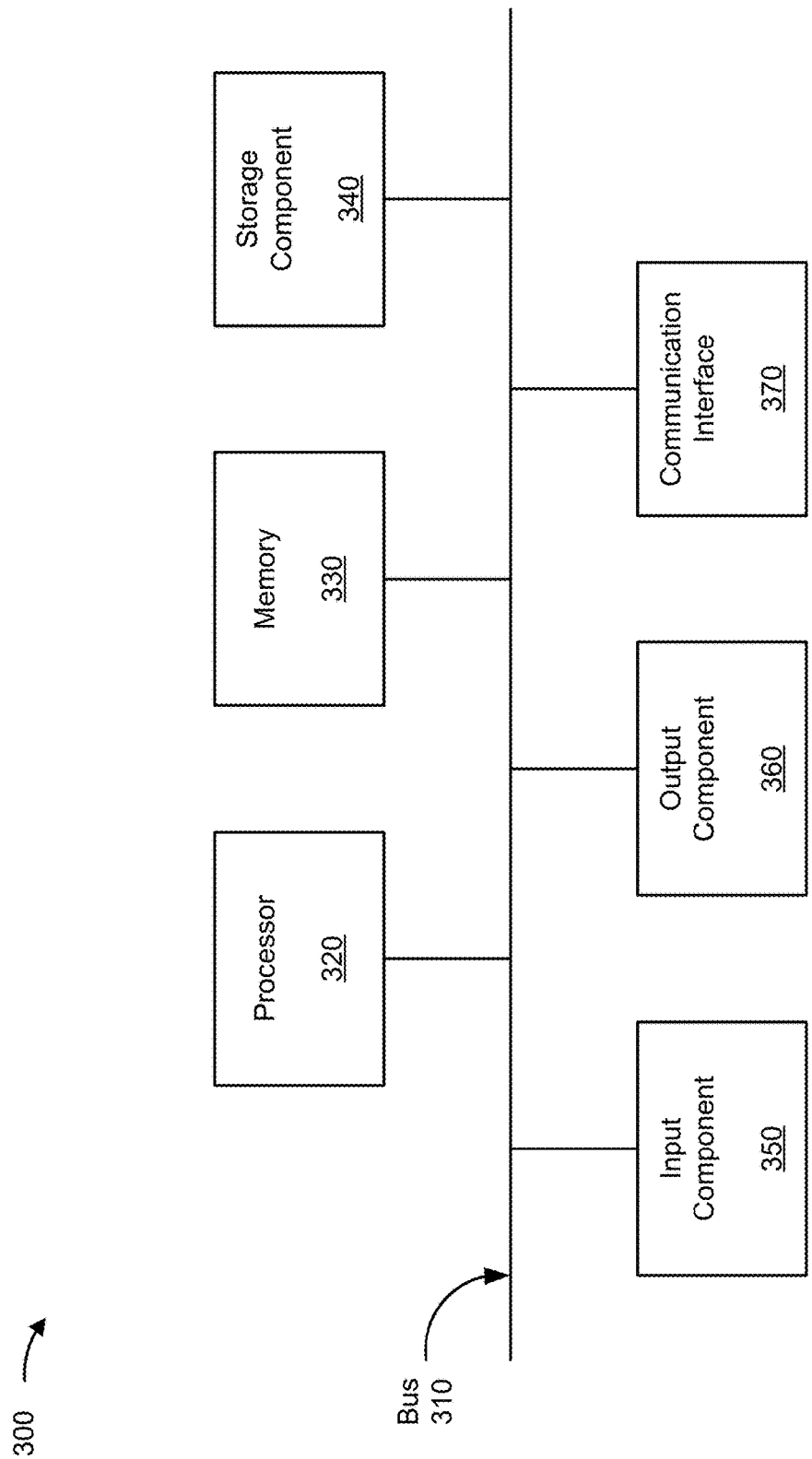
FIG. 3 is a diagram of example components of one or more devices of FIG. 2.

FIG. 3 is a diagram of example components of a device 300. Device 300 may correspond to the first device 210 and/or the second device 220. In some implementations, the first device 210 and/or the second device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
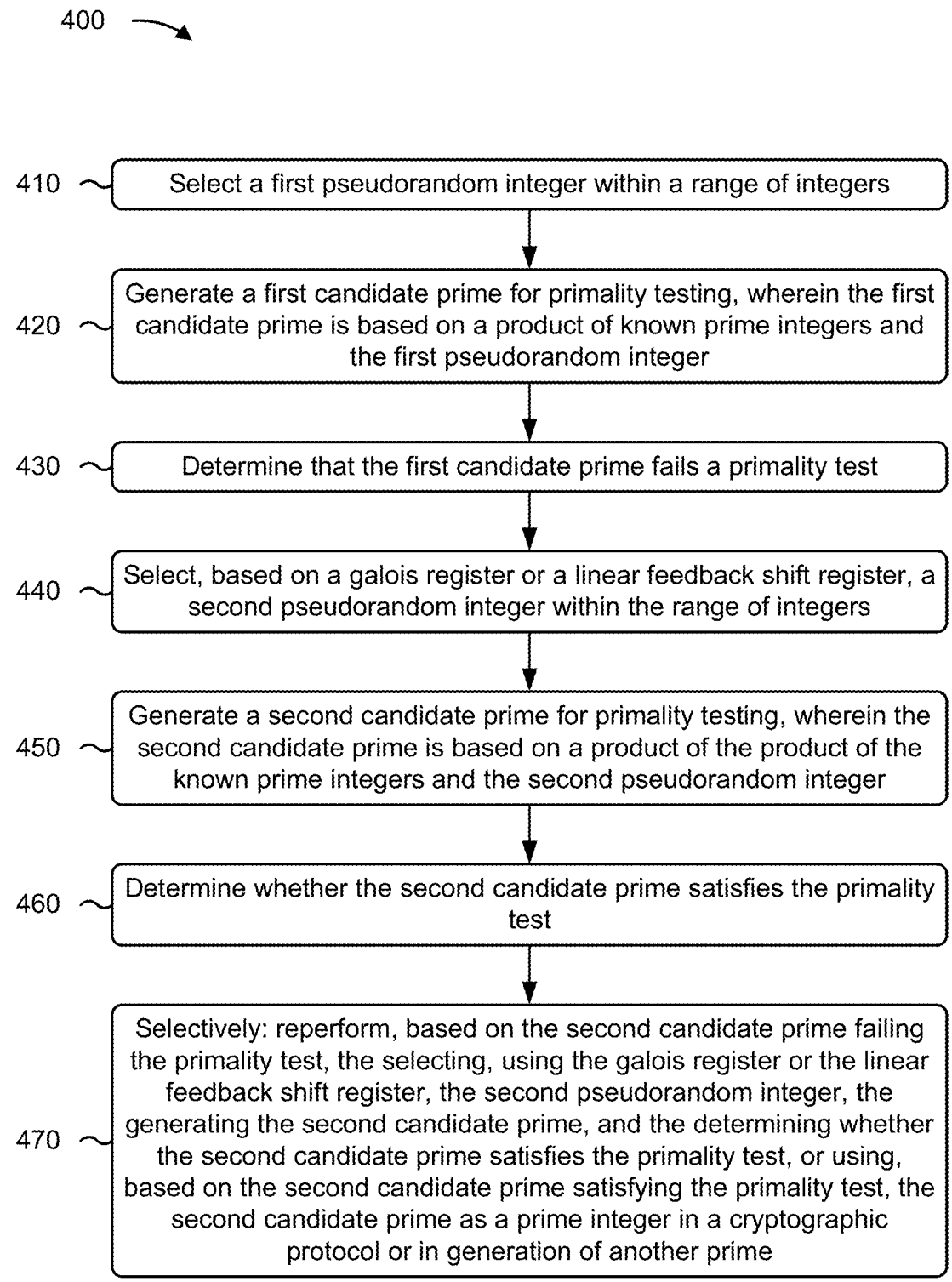
FIGS. 4-6 are flowcharts of example processes for prime number generation for encryption.

FIG. 4 is a flow chart of an example process 400 for prime number generation for encryption. In some implementations, one or more process blocks of FIG. 4 may be performed by a device (e.g., first device 210). In some implementations, one or more process blocks of FIG. 4 may be performed by another device or a group of devices separate from or including the device, such as a second device (e.g., second device 220]), and/or the like.

As shown in FIG. 4, process 400 may include selecting a first pseudorandom integer within a range of integers (block 410). For example, the device (e.g., using processor 320, memory 330, storage component 340, input component 350, output component 360, communication interface 370, and/or the like) may select a first pseudorandom integer within a range of integers, as described above.

As further shown in FIG. 4, process 400 may include generating a first candidate prime for primality testing, wherein the first candidate prime is based on a product of known prime integers and the first pseudorandom integer (block 420). For example, the device (e.g., using processor 320, memory 330, storage component 340, input component 350, output component 360, communication interface 370, and/or the like) may generate a first candidate prime for primality testing, as described above. In some implementations, the first candidate prime is based on a product of known prime integers and the first pseudorandom integer.

As further shown in FIG. 4, process 400 may include determining that the first candidate prime fails a primality test (block 430). For example, the device (e.g., using processor 320, memory 330, storage component 340, input component 350, output component 360, communication interface 370, and/or the like) may determine that the first candidate prime fails a primality test, as described above.

As further shown in FIG. 4, process 400 may include selecting, based on a Galois register or a linear feedback shift register, a second pseudorandom integer within the range of integers (block 440). For example, the device (e.g., using processor 320, memory 330, storage component 340, input component 350, output component 360, communication interface 370, and/or the like) may select, based on a Galois register or a linear feedback shift register, a second pseudorandom integer within the range of integers, as described above.

As further shown in FIG. 4, process 400 may include generating a second candidate prime for primality testing, wherein the second candidate prime is based on a product of the product of the known prime integers and the second pseudorandom integer (block 450). For example, the device (e.g., using processor 320, memory 330, storage component 340, input component 350, output component 360, communication interface 370, and/or the like) may generate a second candidate prime for primality testing, as described above. In some implementations, the second candidate prime is based on a product of the product of the known prime integers and the second pseudorandom integer.

As further shown in FIG. 4, process 400 may include determining whether the second candidate prime satisfies the primality test (block 460). For example, the device (e.g., using processor 320, memory 330, storage component 340, input component 350, output component 360, communication interface 370, and/or the like) may determine whether the second candidate prime satisfies the primality test, as described above.

As further shown in FIG. 4, process 400 may include selectively: re-performing, based on the second candidate prime failing the primality test, the selecting, using the Galois register or the linear feedback shift register, the second pseudorandom integer, the generating the second candidate prime, and the determining whether the second candidate prime satisfies the primality test, or using, based on the second candidate prime satisfying the primality test, the second candidate prime as a prime integer in a cryptographic protocol or in generation of another prime (block 470). For example, the device (e.g., using processor 320, memory 330, storage component 340, input component 350, output component 360, communication interface 370, and/or the like) may selectively re-perform, based on the second candidate prime failing the primality test, the selecting, using the Galois register or the linear feedback shift register, the second pseudorandom integer, the generating the second candidate prime, and the determining whether the second candidate prime satisfies the primality test, or using, based on the second candidate prime satisfying the primality test, the second candidate prime as a prime integer in a cryptographic protocol or in generation of another prime, as described above.

Process 400 may include additional implementations, such as any single implementation or any combination of implementations described below and/or in connection with one or more other processes described elsewhere herein.

In a first implementation, the primality test comprises a Pocklington test.

In a second implementation, alone or in combination with the first implementation, process 400 includes checking the second pseudorandom integer against a sieve to determine whether the second candidate prime, that is based on the product of the known prime integers and the second pseudorandom integer is divisible by any of a set of sieving primes; and selectively: determining that the second candidate prime fails the primality test based on the second candidate prime being divisible by any of the set of sieving primes, or performing the primality test based on the second candidate prime not being divisible by any of the set of sieving primes.

In a third implementation, alone or in combination with one or more of the first and second implementations, the first candidate prime is further based on adding 1 to the product of the product of the known prime integers and the first pseudorandom integer.

In a fourth implementation, alone or in combination with one or more of the first through third implementations, the first pseudorandom integer is a pseudorandom starting value within the range of integers.

In a fifth implementation, alone or in combination with one or more of the first through fourth implementations, the second pseudorandom integer is based on the first pseudorandom integer.

In a sixth implementation, alone or in combination with one or more of the first through fifth implementations, process 400 includes determining, based on satisfaction of a timing threshold, to replace the prime integer with a replacement prime integer; selecting a third pseudorandom integer within the range of integers; generating a third candidate prime for primality testing, wherein the third candidate prime is based on a product of the product of the known prime integers and the third pseudorandom integer; determining that the third candidate prime fails the primality test; selecting, using the Galois register or the linear feedback shift register, a fourth pseudorandom integer within the range of integers; generating a fourth candidate prime for primality testing, wherein the fourth candidate prime is based on a product of the product of the known prime integers and the fourth pseudorandom integer; determining whether the fourth candidate prime satisfies the primality test; and selectively: re-performing, based on the fourth candidate prime failing the primality test, the selecting, using the Galois register or the linear feedback shift register, the fourth pseudorandom integer, generating the fourth candidate prime, and the determining whether the fourth candidate prime satisfies the primality test, or using, by the device and based on the fourth candidate prime satisfying the primality test, the fourth candidate prime as the replacement prime integer in the cryptographic protocol or in generation of larger prime.

In a seventh implementation, alone or in combination with one or more of the first through sixth implementations, using the prime integer in a cryptographic protocol comprises: generating a private key, generating a public key, authenticating a key received from another device, or establishing a shared key with another device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
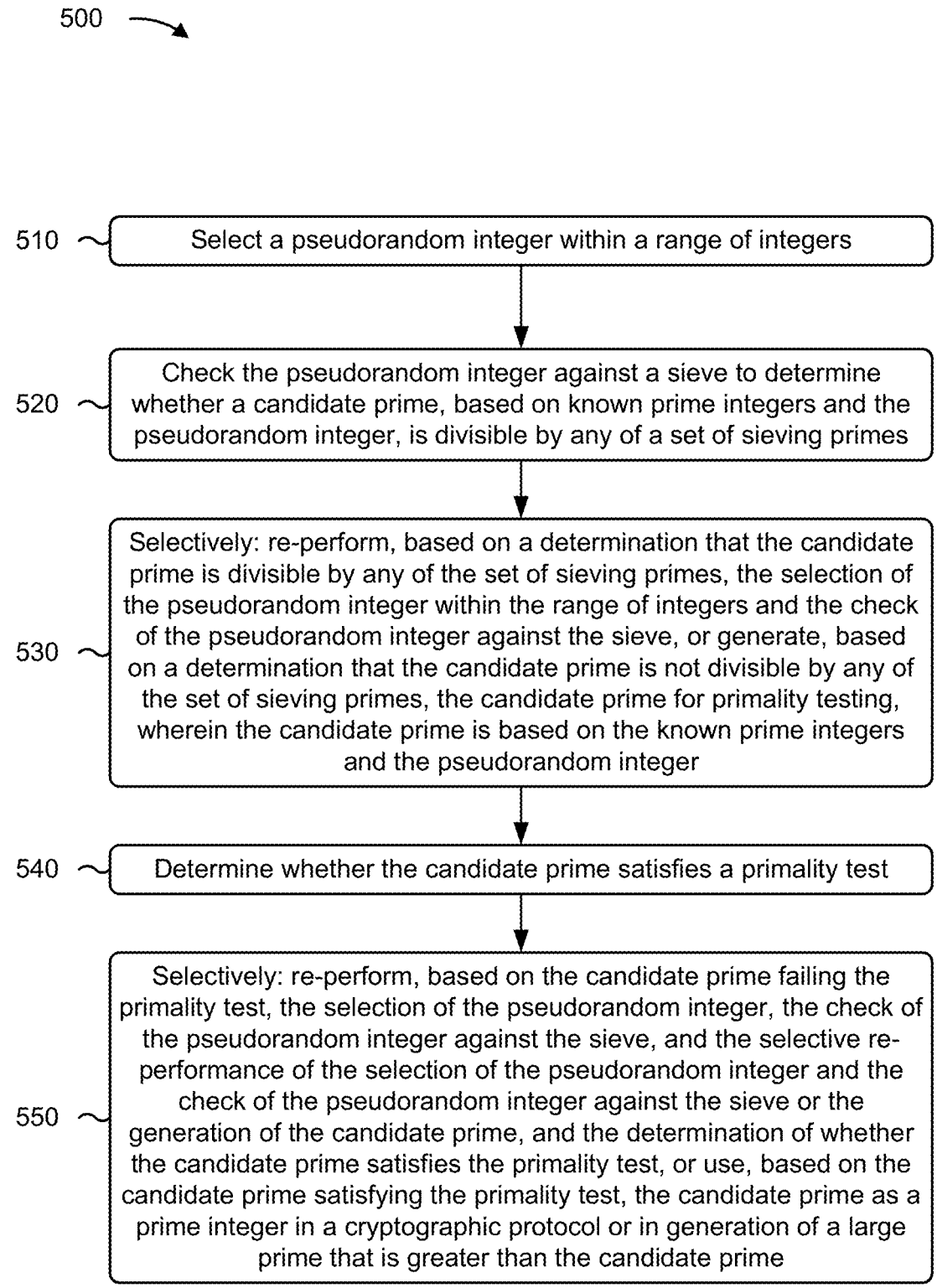

FIG. 5 is a flow chart of an example process 500 for prime number generation for encryption. In some implementations, one or more process blocks of FIG. 5 may be performed by a device (e.g., first device 210). In some implementations, one or more process blocks of FIG. 5 may be performed by another device or a group of devices separate from or including the device, such as a second device (e.g., the second device 220), and/or the like.

As shown in FIG. 5, process 500 may include selecting a pseudorandom integer within a range of integers (block 510). For example, the device (e.g., using processor 320, memory 330, storage component 340, input component 350, output component 360, communication interface 370, and/or the like) may select a pseudorandom integer within a range of integers, as described above.

As further shown in FIG. 5, process 500 may include checking the pseudorandom integer against a sieve to determine whether a candidate prime, based on known prime integers and the pseudorandom integer, is divisible by any of a set of sieving primes (block 520). For example, the device (e.g., using processor 320, memory 330, storage component 340, input component 350, output component 360, communication interface 370, and/or the like) may check the pseudorandom integer against a sieve to determine whether a candidate prime, based on known prime integers and the pseudorandom integer, is divisible by any of a set of sieving primes, as described above.

As further shown in FIG. 5, process 500 may include selectively: re-performing, based on a determination that the candidate prime is divisible by any of the set of sieving primes, the selection of the pseudorandom integer within the range of integers and the check of the pseudorandom integer against the sieve, or generating, based on a determination that the candidate prime is not divisible by any of the set of sieving primes, the candidate prime for primality testing, wherein the candidate prime is based on the known prime integers and the pseudorandom integer (block 530). For example, the device (e.g., using processor 320, memory 330, storage component 340, input component 350, output component 360, communication interface 370, and/or the like) may selectively re-perform, based on a determination that the candidate prime is divisible by any of the set of sieving primes, the selection of the pseudorandom integer within the range of integers and the check of the pseudorandom integer against the sieve, or generate, based on a determination that the candidate prime is not divisible by any of the set of sieving primes, the candidate prime for primality testing, wherein the candidate prime is based on the known prime integers and the pseudorandom integer, as described above. In some implementations, the candidate prime is based on the known prime integers and the pseudorandom integer.

As further shown in FIG. 5, process 500 may include determining whether the candidate prime satisfies a primality test (block 540). For example, the device (e.g., using processor 320, memory 330, storage component 340, input component 350, output component 360, communication interface 370, and/or the like) may determine whether the candidate prime satisfies a primality test, as described above.

As further shown in FIG. 5, process 500 may include selectively: re-performing, based on the candidate prime failing the primality test, the selection of the pseudorandom integer, the check of the pseudorandom integer against the sieve, and the selective re-performance of the selection of the pseudorandom integer and the check of the pseudorandom integer against the sieve or the generation of the candidate prime, and the determination of whether the candidate prime satisfies the primality test, or using, based on the candidate prime satisfying the primality test, the candidate prime as a prime integer in a cryptographic protocol or in generation of a large prime that is greater than the candidate prime (block 550). For example, the device (e.g., using processor 320, memory 330, storage component 340, input component 350, output component 360, communication interface 370, and/or the like) may selectively re-perform, based on the candidate prime failing the primality test, the selection of the pseudorandom integer, the check of the pseudorandom integer against the sieve, and the selective re-performance of the selection of the pseudorandom integer and the check of the pseudorandom integer against the sieve or the generation of the candidate prime, and the determination of whether the candidate prime satisfies the primality test, or use, based on the candidate prime satisfying the primality test, the candidate prime as a prime integer in a cryptographic protocol or in generation of a large prime that is greater than the candidate prime, as described above.

Process 500 may include additional implementations, such as any single implementation or any combination of implementations described below and/or in connection with one or more other processes described elsewhere herein.

In a first implementation, the primality test comprises a Pocklington test.

In a second implementation, alone or in combination with the first implementation, process 500 includes selecting the pseudorandom integer based on a Galois register or a linear feedback shift register.

In a third implementation, alone or in combination with one or more of the first and second implementations, the pseudorandom integer is a pseudorandom starting value within the range of integers.

In a fourth implementation, alone or in combination with one or more of the first through third implementations, process 500 includes determining, based on satisfaction of a timing threshold, to replace the known prime integers with replacement known prime integers; selecting an additional pseudorandom integer within the range of integers; checking the additional pseudorandom integer against the sieve to determine whether a candidate replacement prime, generated based on a product of the replacement known prime integers and the additional pseudorandom integer, is divisible by any of the set of sieving primes; selectively: re-performing, based on a determination that the candidate replacement prime is divisible by any of the set of sieving primes, the selection of the additional pseudorandom integer within the range of integers and the check of the additional pseudorandom integer against the sieve, or generating the candidate replacement prime for primality testing; and determining whether the candidate replacement prime satisfies the primality test; and selectively: re-performing, based on the candidate replacement prime failing the primality test, the selection of the additional pseudorandom integer, the check of the additional pseudorandom integer against the sieve, and the selective re-performance of the selection of the additional pseudorandom integer and the check of the additional pseudorandom integer against the sieve or the generation of the candidate replacement prime, and the determination of whether an additional candidate replacement prime satisfies the primality test, or using, based on the candidate replacement prime satisfying the primality test, the candidate replacement prime as the replacement prime integer in the cryptographic protocol or in generation of replacement large prime that is greater than the replacement prime integer.

In a fifth implementation, alone or in combination with one or more of the first through fourth implementations, process 500 includes generating a private key, generating a public key, authenticating a key received from another device, or establishing a shared key with another device Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
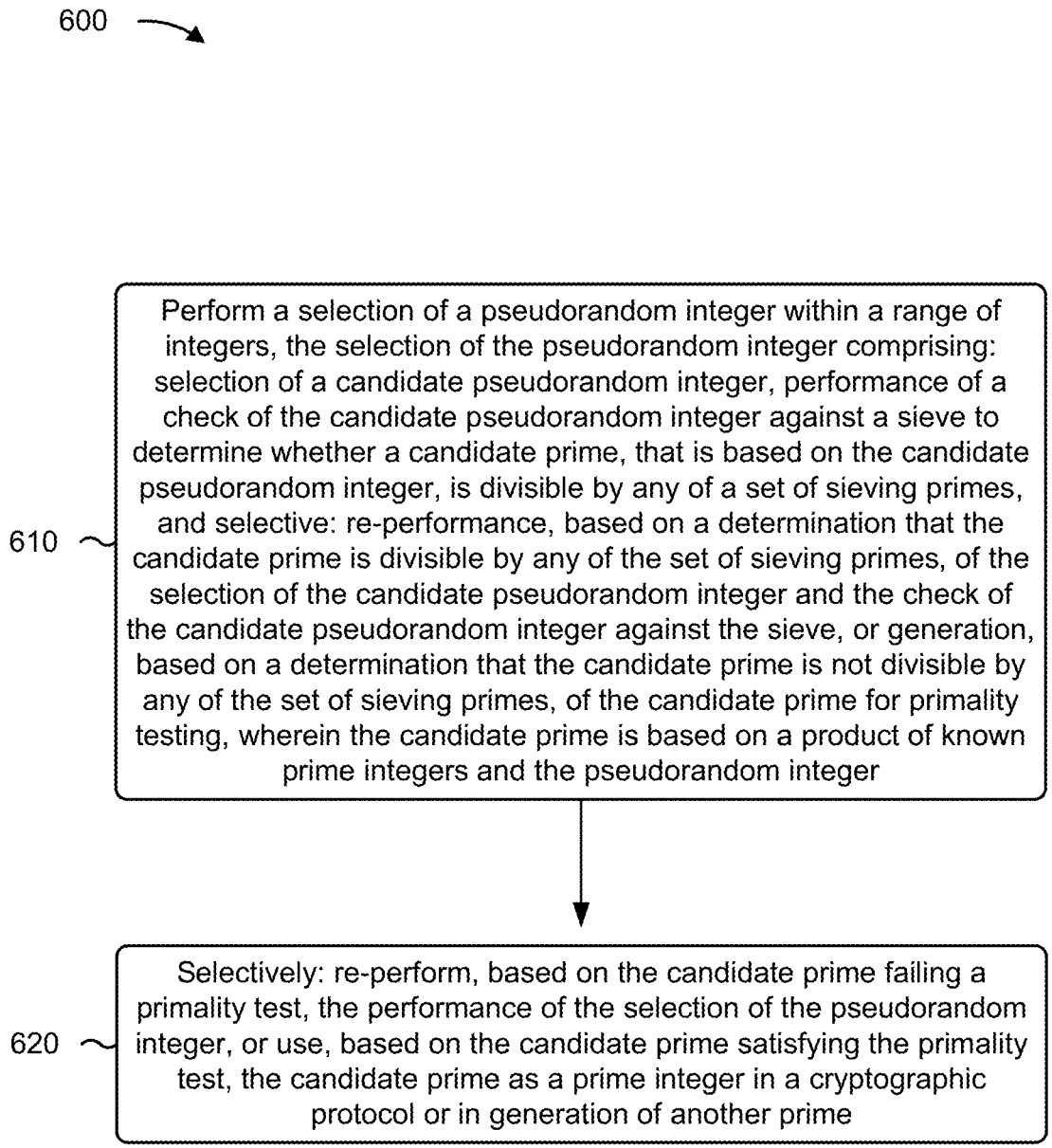

FIG. 6 is a flow chart of an example process 600 for prime number generation for encryption. In some implementations, one or more process blocks of FIG. 6 may be performed by a device (e.g., first device 210). In some implementations, one or more process blocks of FIG. 6 may be performed by another device or a group of devices separate from or including the device, such as a second device (e.g., second device 220), and/or the like.

As shown in FIG. 6, process 600 may include performing a selection of a pseudorandom integer within a range of integers, the selection of the pseudorandom integer comprising: selection of a candidate pseudorandom integer, performance of a check of the candidate pseudorandom integer against a sieve to determine whether a candidate prime, that is based on the candidate pseudorandom integer, is divisible by any of a set of sieving primes, and selective: re-performance, based on a determination that the candidate prime is divisible by any of the set of sieving primes, of the selection of the candidate pseudorandom integer and the check of the candidate pseudorandom integer against the sieve, or generation, based on a determination that the candidate prime is not divisible by any of the set of sieving primes, of the candidate prime for primality testing, wherein the candidate prime is based on a product of known prime integers and the pseudorandom integer (block 610). For example, the device (e.g., using processor 320, memory 330, storage component 340, input component 350, output component 360, communication interface 370, and/or the like) may perform a selection of a pseudorandom integer within a range of integers, the selection of the pseudorandom integer comprising: selection of a candidate pseudorandom integer, performance of a check of the candidate pseudorandom integer against a sieve to determine whether a candidate prime, that is based on the candidate pseudorandom integer, is divisible by any of a set of sieving primes, and selective: re-performance, based on a determination that the candidate prime is divisible by any of the set of sieving primes, of the selection of the candidate pseudorandom integer and the check of the candidate pseudorandom integer against the sieve, or generation, based on a determination that the candidate prime is not divisible by any of the set of sieving primes, of the candidate prime for primality testing, wherein the candidate prime is based on a product of known prime integers and the pseudorandom integer, as described above.

As further shown in FIG. 6, process 600 may include selectively: re-performing, based on the candidate prime failing a primality test, the performance of the selection of the pseudorandom integer, or using, based on the candidate prime satisfying the primality test, the candidate prime as a prime integer in a cryptographic protocol or in generation of another prime (block 620). For example, the device (e.g., using processor 320, memory 330, storage component 340, input component 350, output component 360, communication interface 370, and/or the like) may selectively re-perform, based on the candidate prime failing a primality test, the performance of the selection of the pseudorandom integer, or use, based on the candidate prime satisfying the primality test, the candidate prime as a prime integer in a cryptographic protocol or in generation of another prime, as described above.

Process 600 may include additional implementations, such as any single implementation or any combination of implementations described below and/or in connection with one or more other processes described elsewhere herein.

In a first implementation, the primality test comprises a Pocklington test.

In a second implementation, alone or in combination with the first implementation, the candidate prime is further based on adding 1 to the product of known prime integers and the pseudorandom integer.

In a third implementation, alone or in combination with one or more of the first and second implementations, a first iteration of the pseudorandom integer is a pseudorandom starting value within the range of integers.

In a fourth implementation, alone or in combination with one or more of the first through third implementations, a second iteration of the pseudorandom integer is based on a first iteration of the pseudorandom integer.

In a fifth implementation, alone or in combination with one or more of the first through fourth implementations, process 600 includes generating a private key, generating a public key, authenticating a key received from another device, or establishing a shared key with another device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used.

Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    selecting, by a device, a first pseudorandom integer within a range of integers;
    generating, by the device, a first candidate prime for primality testing,
        wherein the first candidate prime is based on a product of known prime integers and the first pseudorandom integer;
    determining, by the device, that the first candidate prime fails a primality test;
    selecting, by the device and based on a Galois register or a linear feedback shift register, a second pseudorandom integer within the range of integers
        wherein selecting the second pseudorandom integer includes:
            increasing an upper limit of the range of integers based on failing to identify a potential second pseudorandom integer based on the Galois register or the linear feedback shift register, and
            identifying the second pseudorandom integer within the range of integers based on increasing the upper limit of the range of integers;
    generating, by the device, a second candidate prime for primality testing,
        wherein the second candidate prime is based on a product of the product of the known prime integers and the second pseudorandom integer;
    determining, by the device, whether the second candidate prime satisfies the primality test; and
    selectively:
        re-performing, by the device and based on the second candidate prime failing the primality test, the selecting, using the Galois register or the linear feedback shift register, the second pseudorandom integer, the generating the second candidate prime, and the determining whether the second candidate prime satisfies the primality test, or
        using, by the device and based on the second candidate prime satisfying the primality test, the second candidate prime as a prime integer in a cryptographic protocol or in generation of another prime.

2. The method of claim 1, wherein the primality test comprises a Pocklington test.

3. The method of claim 1, further comprising:
    checking the second pseudorandom integer against a sieve to determine whether the second candidate prime, that is based on the product of the known prime integers and the second pseudorandom integer is divisible by any of a set of sieving primes; and
    selectively:
        determining that the second candidate prime fails the primality test based on the second candidate prime being divisible by any of the set of sieving primes, or
        performing the primality test based on the second candidate prime not being divisible by any of the set of sieving primes.

4. The method of claim 1, wherein the first candidate prime is further based on adding 1 to the product of the product of the known prime integers and the first pseudorandom integer.

5. The method of claim 1, wherein the first pseudorandom integer is a pseudorandom starting value within the range of integers.

6. The method of claim 1, wherein the second pseudorandom integer is based on the first pseudorandom integer.

7. The method of claim 1, further comprising:
    determining, based on satisfaction of a timing threshold, to replace the prime integer with a replacement prime integer;
    selecting a third pseudorandom integer within the range of integers;
    generating a third candidate prime for primality testing,
        wherein the third candidate prime is based on a product of the product of the known prime integers and the third pseudorandom integer;
    determining that the third candidate prime fails the primality test;
    selecting, using the Galois register or the linear feedback shift register, a fourth pseudorandom integer within the range of integers;
    generating a fourth candidate prime for primality testing,
        wherein the fourth candidate prime is based on a product of the product of the known prime integers and the fourth pseudorandom integer;
    determining whether the fourth candidate prime satisfies the primality test; and
    selectively:
        re-performing, based on the fourth candidate prime failing the primality test, the selecting, using the Galois register or the linear feedback shift register, the fourth pseudorandom integer, generating the fourth candidate prime, and the determining whether the fourth candidate prime satisfies the primality test, or
        using, by the device and based on the fourth candidate prime satisfying the primality test, the fourth candidate prime as the replacement prime integer in the cryptographic protocol or in generation of larger prime.

8. The method of claim 1, wherein using the prime integer in a cryptographic protocol comprises:
    generating a private key,
    generating a public key,
    authenticating a key received from another device, or
    establishing a shared key with another device.

9. A device, comprising:
    one or more memories; and
    one or more processors to:
        select a pseudorandom integer within a range of integers;
        check the pseudorandom integer against a sieve to determine whether a candidate prime, based on known prime integers and the pseudorandom integer, is divisible by any of a set of sieving primes;
        selectively:
            re-perform, based on a determination that the candidate prime is divisible by any of the set of sieving primes, the selection of the pseudorandom integer within the range of integers and the check of the pseudorandom integer against the sieve, or
            generate, based on a determination that the candidate prime is not divisible by any of the set of sieving primes, the candidate prime for primality testing, wherein the candidate prime is based on the known prime integers and the pseudorandom integer;
determine whether the candidate prime satisfies a primality test;
re-perform, based on the candidate prime failing the primality test, the selection of the pseudorandom integer:
wherein the one or more processors, to re-perform the selection of the pseudorandom integer, are configured to:
increase an upper limit of the range of integers, and
identify another pseudorandom integer within the range of integers based on increasing the upper limit of the range of integers to use as the pseudorandom integer; and
selectively:
re-perform, based on the candidate prime failing the primality test, the selection of the pseudorandom integer, the check of the pseudorandom integer against the sieve, and the selective re-performance of the selection of the pseudorandom integer and the check of the pseudorandom integer against the sieve or the generation of the candidate prime, and the determination of whether the candidate prime satisfies the primality test, or
use, based on the candidate prime satisfying the primality test, the candidate prime as a prime integer in a cryptographic protocol or in generation of a large prime that is greater than the candidate prime.

10. The device of claim 9, wherein the primality test comprises a Pocklington test.

11. The device of claim 9, wherein the one or more processors are further to:
select the pseudorandom integer based on a Galois register or a linear feedback shift register.

12. The device of claim 9, wherein the pseudorandom integer is a pseudorandom starting value within the range of integers.

13. The device of claim 9, wherein the one or more processors are further to:
determine, based on satisfaction of a timing threshold, to replace the known prime integers with replacement known prime integers;
select an additional pseudorandom integer within the range of integers;
check the additional pseudorandom integer against the sieve to determine whether a candidate replacement prime, generated based on a product of the replacement known prime integers and the additional pseudorandom integer, is divisible by any of the set of sieving primes;
selectively:
re-perform, based on a determination that the candidate replacement prime is divisible by any of the set of sieving primes, the selection of the additional pseudorandom integer within the range of integers and the check of the additional pseudorandom integer against the sieve, or
generate the candidate replacement prime for primality testing; and
determine whether the candidate replacement prime satisfies the primality test; and
selectively:
re-perform, based on the candidate replacement prime failing the primality test, the selection of the additional pseudorandom integer, the check of the additional pseudorandom integer against the sieve, and the selective re-performance of the selection of the additional pseudorandom integer and the check of the additional pseudorandom integer against the sieve or the generation of the candidate replacement prime, and the determination of whether an additional candidate replacement prime satisfies the primality test, or
use, based on the candidate replacement prime satisfying the primality test, the candidate replacement prime as the replacement prime integer in the cryptographic protocol or in generation of replacement large prime that is greater than the replacement prime integer.

14. The device of claim 9, wherein the one or more processors, when using the prime integer in a cryptographic protocol, are to:
generate a private key,
generate a public key,
authenticate a key received from another device, or
establish a shared key with another device.

15. A non-transitory computer-readable medium storing instructions, the instructions comprising:
one or more instructions that, when executed by one or more processors, cause the one or more processors to:
perform a selection of a pseudorandom integer within a range of integers, the selection of the pseudorandom integer comprising:
selection of a candidate pseudorandom integer;
performance of a check of the candidate pseudorandom integer against a sieve to determine whether a candidate prime, that is based on the candidate pseudorandom integer, is divisible by any of a set of sieving primes; and
selective:
re-performance, based on a determination that the candidate prime is divisible by any of the set of sieving primes, of the selection of the candidate pseudorandom integer and the check of the candidate pseudorandom integer against the sieve, or
generation, based on a determination that the candidate prime is not divisible by any of the set of sieving primes, of the candidate prime for primality testing,
wherein the candidate prime is based on a product of known prime integers and the pseudorandom integer;
re-perform, based on the candidate prime failing the primality test, the selection of the pseudorandom integer:
wherein the one or more instructions, that cause the one or more processors to re-perform the selection of the pseudorandom integer, cause the one or more processors to:
increase an upper limit of the range of integers, and
identify another pseudorandom integer within the range of integers based on increasing the upper limit of the range of integers to use as the pseudorandom integer; and
selectively:
re-perform, based on the candidate prime failing a primality test, the performance of the selection of the pseudorandom integer, or
use, based on the candidate prime satisfying the primality test, the candidate prime as a prime integer in a cryptographic protocol or in generation of another prime.

16. The non-transitory computer-readable medium of claim 15, wherein the primality test comprises a Pocklington test.

17. The non-transitory computer-readable medium of claim 15, wherein the candidate prime is further based on adding 1 to the product of known prime integers and the pseudorandom integer.

18. The non-transitory computer-readable medium of claim 15, wherein a first iteration of the pseudorandom integer is a pseudorandom starting value within the range of integers.

19. The non-transitory computer-readable medium of claim 15, wherein a second iteration of the pseudorandom integer is based on a first iteration of the pseudorandom integer.

20. The non-transitory computer-readable medium of claim 15, wherein the one or more instructions, that cause the one or more processors to use the prime integer in a cryptographic protocol, cause the one or more processors to:
   generate a private key,
   generate a public key,
   authenticate a key received from another device, or
   establish a shared key with another device.

* * * * *